(12) United States Patent
Park et al.

(10) Patent No.: US 9,491,437 B2
(45) Date of Patent: Nov. 8, 2016

(54) TRANSMITTER FOR TRANSMITTING DATA FOR CONSTITUTING CONTENT, RECEIVER FOR RECEIVING AND PROCESSING DATA, AND METHOD THEREFOR

(75) Inventors: Hong-Seok Park, Anyang-si (KR); Yong-Tae Kim, Suwon-si (KR); Jae-Jun Lee, Suwon-si (KR); Moon-Seok Jang, Seoul (KR); Yu-Sung Joo, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 13/992,297

(22) PCT Filed: Dec. 7, 2011

(86) PCT No.: PCT/KR2011/009441
§ 371 (c)(1),
(2), (4) Date: Jun. 7, 2013

(87) PCT Pub. No.: WO2012/077981
PCT Pub. Date: Jun. 14, 2012

(65) Prior Publication Data
US 2013/0251342 A1    Sep. 26, 2013

Related U.S. Application Data

(60) Provisional application No. 61/420,449, filed on Dec. 7, 2010.

(51) Int. Cl.
*H04N 21/43* (2011.01)
*H04N 13/00* (2006.01)
(Continued)

(52) U.S. Cl.
CPC ...... *H04N 13/0055* (2013.01); *H04N 21/4307* (2013.01); *H04N 21/4331* (2013.01); *H04N 21/4627* (2013.01); *H04N 21/631* (2013.01); *H04N 21/8355* (2013.01)

(58) Field of Classification Search
None
See application file for complete search history.

(56) References Cited

U.S. PATENT DOCUMENTS

| 5,619,256 A | 4/1997 | Haskell et al. |
|---|---|---|
| 5,995,516 A | 11/1999 | Iwasaki et al. |

(Continued)

FOREIGN PATENT DOCUMENTS

| CN | 1384671 A | 12/2002 |
|---|---|---|
| CN | 101044572 A | 9/2007 |

(Continued)

OTHER PUBLICATIONS

International Search Report dated May 24, 2012 issued in International Application No. PCT/KR2011/009441 (PCT/ISA/210).

(Continued)

*Primary Examiner* — Eileen Adams
(74) *Attorney, Agent, or Firm* — Sughrue Mion, PLLC

(57) ABSTRACT

A receiver is disclosed. The receiver comprises: a first receiving unit for receiving non-real-time data for constituting multimedia content; a storage unit for storing the non-real-time data; a second receiving unit for receiving real-time data for constituting multimedia content; a data processing unit which, if the real-time data has been received, detects the non-real-time data, in conjunction with the real-time data, from among the data stored in the storage unit, binds the detected non-real-time data and the received real-time data, and outputs multimedia content; and a control unit for controlling the data processing unit so as to restrict the output of the non-real-time data prior to the time of the output of the real-time data.

13 Claims, 24 Drawing Sheets

(51) Int. Cl.
*H04N 21/4627* (2011.01)
*H04N 21/63* (2011.01)
*H04N 21/433* (2011.01)
*H04N 21/8355* (2011.01)

(56) References Cited

U.S. PATENT DOCUMENTS

| | | | |
|---|---|---|---|
| RE37,991 E | 2/2003 | Legate | |
| 7,337,321 B2 | 2/2008 | Terada et al. | |
| 7,848,425 B2 | 12/2010 | Cho et al. | |
| 8,045,665 B2 | 10/2011 | Kwon et al. | |
| 8,059,775 B2 | 11/2011 | Kwon et al. | |
| 2003/0053797 A1 | 3/2003 | Oshima et al. | |
| 2003/0191941 A1 | 10/2003 | Terada et al. | |
| 2003/0198271 A1 | 10/2003 | Matveev | |
| 2006/0269226 A1 | 11/2006 | Ito et al. | |
| 2007/0120972 A1 | 5/2007 | Kim et al. | |
| 2007/0196077 A1 | 8/2007 | Seo et al. | |
| 2007/0280361 A1 | 12/2007 | Kwon et al. | |
| 2008/0075437 A1* | 3/2008 | Hamada | G11B 27/329 386/343 |
| 2009/0031365 A1 | 1/2009 | Kwon et al. | |
| 2009/0055650 A1* | 2/2009 | Nakano | G06T 1/0071 713/176 |
| 2009/0276819 A1 | 11/2009 | Kim et al. | |
| 2010/0077204 A1* | 3/2010 | Kawano | H04L 63/06 713/153 |
| 2010/0272417 A1 | 10/2010 | Nagasawa et al. | |
| 2010/0315489 A1 | 12/2010 | Shepherd | |
| 2010/0325676 A1 | 12/2010 | Kim et al. | |
| 2011/0025821 A1 | 2/2011 | Curtis et al. | |
| 2011/0033170 A1 | 2/2011 | Ikeda et al. | |
| 2011/0081131 A1 | 4/2011 | Hattori | |
| 2011/0090309 A1 | 4/2011 | Suzuki et al. | |
| 2011/0128355 A1 | 6/2011 | Suzuki et al. | |
| 2011/0134220 A1* | 6/2011 | Barbour | H04N 13/0207 348/44 |
| 2011/0134227 A1 | 6/2011 | Shin | |
| 2011/0164121 A1 | 7/2011 | Ikeda et al. | |
| 2013/0251342 A1 | 9/2013 | Park et al. | |
| 2013/0293677 A1 | 11/2013 | Lee et al. | |
| 2014/0047475 A1 | 2/2014 | Oh et al. | |
| 2014/0181884 A1 | 6/2014 | Kim et al. | |

FOREIGN PATENT DOCUMENTS

| | | |
|---|---|---|
| CN | 101047848 A | 10/2007 |
| CN | 101232623 A | 7/2008 |
| CN | 101438615 A | 5/2009 |
| CN | 101578887 A | 11/2009 |
| EP | 1783771 A1 | 5/2007 |
| EP | 2211556 A1 | 7/2010 |
| JP | 2003-298834 A | 10/2003 |
| JP | 200440455 A | 2/2004 |
| JP | 2004-357156 A | 12/2004 |
| JP | 2006-324739 A | 11/2006 |
| KR | 10-2006-0100347 A | 9/2006 |
| KR | 10-2008-0034813 A | 4/2008 |
| WO | 2007142445 A1 | 12/2007 |
| WO | 2009/134105 A2 | 11/2009 |
| WO | 2010053246 A2 | 5/2010 |

OTHER PUBLICATIONS

Communication dated Jan. 12, 2015, issued by the State Intellectual Property Office of the People's Republic of China in counterpart Chinese Application No. 201180059206.6.
Hyun Lee, et al., "A Structure for 2D/3D Mixed Service Based on Terrestrial DMB System", 3DTV Conference, May 1, 2007, 4 pgs. total, XP031158177.
Communication dated Aug. 5, 2015, issued by the State Intellectual Property of P.R. China in counterpart Chinese Application No. 201180059206.6.
Communication dated Sep. 8, 2015, issued by the Japanese Patent Office in counterpart Japanese Application No. 2013-543098.
Communication dated Jan. 20, 2016, from the State Intellectual Property Office of People's Republic of China in counterpart Application No. 201180059206.6.
Communication dated Nov. 25, 2015, from the State Intellectual Property Office of People's Republic of China in counterpart Application No. 201180066030.7.
Communication dated Apr. 25, 2016 issued by European Patent Office in counterpart European Patent Application No. 11 846 165.6.
Communication dated Mar. 8, 2016 issued by United States Patent and Trademark Office in counterpart U.S. Appl. No. 13/992,355.
Communication dated May 31, 2016, issued by the Japanese Patent Office in counterpart Japanese application No. 2013-543098.
Communication dated Jul. 11, 2016, issued by the State Intellectual Property Office of P.R. China in counterpart Chinese application No. 201180059206.6.
Communication dated Aug. 1, 2016, issued by the State Intellectual Property Office of P.R. China in counterpart Chinese application No. 201180066030.7.
Communication dated Sep. 2, 2016, issued by the United States Patent and Trademark Office in counterpart U.S. Appl. No. 13/992,355.

* cited by examiner

FIG. 4

| Syntax | No. |
|---|---|
| rc_descriptor() { | |
|   descriptor_tag | |
|   descriptor_length | |
|   for(i=0;i<descriptor_length;i++) { | |
|     program_protection_information() | |
|   } | |
| } | |

| Syntax | Bits | NOTES |
|---|---|---|
| program_protection_information() { | | |
|   version | 8 | PPI VERSION INFO. |
|   play_control_code | 2 | PLAYBACK RESTRICTION INDICATOR |
|   If(play_control_code==(01 ‖ 10)) { | | |
|     play_condition() | 8 | PLAYBACK RESTRICTION CONDITION |
|   } | | |
|   redistribution_control_code | | |
|   If(redistribution_control_code==01) { | | |
|     redistribution_condition() | | |
|   } | | |
|   redistribution_area | | |
|   reserved | | |
|   ppi_signature | 320 | SIGNATURE FOR PPI INFO. |

FIG. 5

| VALUE | play_control_code |
|---|---|
| 00 | PLAYBACK RESTRICTION ×, ENCRYPTION ○ |
| 01 | PLAYBACK RESTRICTION ○, ENCRYPTION × |
| 10 | PLAYBACK RESTRICTION ○, ENCRYPTION ○ |
| 11 | reserved |

FIG. 6

| Syntax | Bits | NOTES |
|---|---|---|
| play_condition() { | | |
| allowed_max_resolution | 2 | MAX. AVAILABLE PLAYBACK RESOLUTION BEFORE PLAYBACK TIME |
| pre_playable_time | 33 | PLAYBACK TIME ALLOWED BEFORE PLAYBACK TIME |
| reserved | 5 | ... |
| } | | |

FIG. 7

| Syntax | No. of Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 2 | uimsbf |
|     for (i=0; i<N; i++) { | | |
|         descriptor() | | |
|     } | | |
|     for (i=0; i<N1; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N2; i++) { | | |
|             descriptor() | | |
|         } | | |
|     } | | |
|     CRC_32 | 32 | rpchof |
| } | | |

< PMT table >

PLAYBACK RESTRICTION INDICATOR

FIG. 8

| Syntax | No. of Bits | Format |
|---|---|---|
| event_information_table_section() { | | |
|     table_id | 8 | uimsbf |
|     section_syntax_indicator | 1 | bslbf |
|     private_indicator | 1 | bslbf |
|     reserved | 2 | bslbf |
|     section_length | 12 | uimsbf |
|     section_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     protocol_version | 3 | bslbf |
|     num_events_in_section | 13 | uimsbf |
|     for (j=0; j<num_events_in_section; j++) { | 4 | bslbf |
|         reserved | 2 | uimsbf |
|         event_id | | |
|         start_time | | |
|         reserved | | |
|         ETM_location | | |
|         length_in_seconds | 8 | uimsbf |
|         title_length | 3 | bslbf |
|         title_text() | 13 | uimsbf |
|         reserved | | |
|         descriptors_length | 4 | bslbf |
|         for (i=0; i<N; i++) { | 12 | uimsbf |
|             descriptor() | | |
|         } | | |
|     } | | |
|     CRC_32 | | |
| } | 32 | rpchof |

PLAYBACK RESTRICTION INDICATOR (points to the reserved fields and descriptor())

< EIT table >

FIG. 9

| Syntax | No. of Bits | Mnemonic |
|---|---|---|
| play_restriction_descriptor() { | | |
|    descriptor_tag | 8 | uimsbf |
|    descriptor_length | 8 | uimsbf |
|    content_id | 8 | uimsbf |
|    play_restriction_indicator | 1 | uimsbf |
|    if(play_restriction_indicator = = 1) | | |
|    resctriction_level | 8 | uimsbf |
|    pre_playable_time | 33 | uimsbf |
|    allow_max_resolution | 2 | uimsbf |
|    } | | |
| } | | |

FIG. 18

| Syntax | No. of Bits | Mnemonic |
|---|---|---|
| TS_program_map_section() { | | |
| table_id | 8 | uimsbf |
| section_syntax_indicator | 1 | bslbf |
| "0" | 1 | bslbf |
| reserved | 2 | bslbf |
| section_length | 12 | uimsbf |
| program_number | 16 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| reserved | 3 | bslbf |
| PCR_PID | 13 | uimsbf |
| reserved | 4 | bslbf |
| program_info_length | 2 | uimsbf |
| for (i=0; i<N; i++) { | | |
| descriptor() | | |
| } | | |
| for (i=0; i<N1; i++) { | | |
| stream_type | 8 | uimsbf |
| elementary_PID | 3 | bslbf |
| reserved | 13 | uimsbf |
| ES_info_length | 4 | bslbf |
| for (i=0; i<N2; i++) { | 12 | uimsbf |
| descriptor() | | |
| } | | |
| } | | |
| CRC_32 | 32 | rpchof |
| } | | | content_labeling_descriptor()

| Syntax | Bits | NOTES |
|---|---|---|
| content_decryption_descriptor() | | |
| { | | |
| length | 4 | |
| decryption_key | 32 | DECRYPTION KEYS |
| } | | |

<REAL-TIME CONTENT>

TRANSMITTER FOR TRANSMITTING DATA FOR CONSTITUTING CONTENT, RECEIVER FOR RECEIVING AND PROCESSING DATA, AND METHOD THEREFOR

CROSS-REFERENCE TO RELATED APPLICATION

This is a National Phase Application of International Patent Application No. PCT/KR2011/009441, filed Dec. 7, 2011. This application claims priority from U.S. Provisional Patent Application No. 61/420,449, filed Dec. 7, 2010. The disclosures of the prior applications are hereby incorporated in their entireties by reference.

BACKGROUND

1. Field

Apparatuses and methods consistent with exemplary embodiments relate to a transmitter and a receiver, and a method therefor, and more particularly, to a transmitter which transmits data to constitute part of one content, a receiver which receives the data and processes the same with data transmitted from another transmitter, and a method therefor.

2. Description of the Related Art

Advancement of the electronic technology has enabled development and distribution of a variety of types of electronic apparatuses. A representative example is a receiver such as a television.

Recently, TVs with improved quality provide multimedia content such as 3D content. Since 3D content include left-eye and right-eye images therein, the content size is larger than 2D content.

However, the bandwidth for transmission used in the broadcast network is limited. Accordingly, to provide 3D content over a single broadcast network, it is required that the resolution be decreased, making image quality degradated.

To overcome the above-mentioned shortcoming, a technology has been suggested, according to which data to constitute one content is transmitted via different paths, and the receiver combines the data to reproduce the content. For example, attempts have been made to transmit left-eye image data and right-eye image data via different transmission paths, and combines and process the data.

If some data is provided in a nonreal-time file format and the rest of the data is provided in real-time format, the nonreal-time format data may be transmitted in advance, i.e., prior to transmission of the real-time data, to a receiver and stored therein. However, when one data is transmitted and stored at a receiver side in advance, possibility is that a viewer may play back the stored data. This raises a problem because the broadcast content can be released earlier than the scheduled broadcasting time.

Accordingly, a technology is necessary, which protects the data transmitted to a receiver so that the transmitted data is not played back until a planned time.

SUMMARY

The present invention has been made in order to address the needs mentioned above, and it is an object of the present invention to provide transmitters to transmit real-time data and nonreal-time data to constitute content, a receiver which restricts playback of the nonreal-time data until reception of the real-time data, and a method thereof for processing the content.

In order to achieve the object explained above, an embodiment of the present invention provides a terminal device, which may comprise a first receiver configured to receive nonreal-time data which constitute content, a second receiver configured to receive real-time data which constitute the content, a data processor configured to detect any of the nonreal-time data stored at the storage that is interoperative with the real-time data and combines the detected nonreal-time data with the received real-time data to output the content, and a controller configured to control the data processor to restrict output of the nonreal-time data until a time of outputting the real-time data.

The nonreal-time data may comprise first data which is non-encrypted, a playback restriction indicator to restrict playback of the real-time data until the time of outputting, and first interoperation information to playback in interoperation with the real-time data, wherein the real-time data may comprise second data and second interoperation information to playback in interoperation with the nonreal-time data, and wherein the controller may controls an operation of the data processor according to the playback restriction indicator.

At least one from among the playback restriction indicator and the first interoperation information may be recorded on one from among a program map table (PMT), event information table (EIT), a reserved area, an extended field area, and a new field area within the nonreal-time data, or wherein at least one from among the playback restriction indicator and the first interoperation information is provided via a private stream having an independent packet identifier (PID).

Further, the second receiver may receive preceding real-time data comprising a playback restriction indicator with respect to the nonreal-time data, in advance of receiving real-time data for interoperation with the nonreal-time data, and the controller may control the data processor to restrict playback of the nonreal-time data according to the playback restriction indicator included in the preceding real-time data.

The nonreal-time data may comprise first data which is encrypted, and first interoperation information for playback in interoperation with the real-time data, wherein the real-time data may comprise second data, decryption information with respect to the first data and second interoperation information to playback in interoperation with the nonreal-time data, and wherein the controller may decrypt the first data using the decryption information when the real-time data is received, and controls the data processor to combine the decrypted, first data with the second data and output the content.

The nonreal-time data may comprise first data which is encrypted, and first interoperation information for playback in interoperation with the real-time data, wherein the real-time data may comprise second data, information about a source which provides decryption information with respect to the first data, and second interoperation information for playback in interoperation with the nonreal-time data, and wherein the controller may access the source which provides the decryption information by using the information about the source, when the real-time data is received, decrypt the first data by using the received decryption information, and control the data processor to combine the first data with the second data to playback the content.

The controller may control the data processor to restrictively output the nonreal-time data according to playback restriction condition, when a request for output of the nonreal-time data is inputted before the time of outputting the real-time data.

Meanwhile, in one embodiment of the present invention, a method for processing content is provided, which may comprise receiving nonreal-time data to constitute content, storing the nonreal-time data, receiving real-time data to constitute the content, detecting any of the nonreal-time data that is interoperative with the real-time data and combining the detected nonreal-time data with the received real-time data and outputting the content, and restricting output of the nonreal-time data until a time of outputting the real-time data.

The nonreal-time data may comprise first data which is non-encrypted, a playback restriction indicator to restrict playback of the real-time data until the time of outputting, and first interoperation information to playback in interoperation with the real-time data, and wherein the real-time data may comprise second data and second interoperation information to playback in interoperation with the nonreal-time data.

The method may additionally comprise receiving preceding real-time data comprising a playback restriction indicator with respect to the nonreal-time data, in advance of receiving the real-time data for interoperation with the nonreal-time data. Playback of the nonreal-time data may be restricted according to the playback restriction indicator included in the preceding real-time data.

The nonreal-time data may comprise first data which is encrypted, and first interoperation information for playback in interoperation with the real-time data, wherein the real-time data may comprise second data, decryption information with respect to the first data and second interoperation information to playback in interoperation with the nonreal-time data, and the outputting the multimedia content may comprise detecting the decryption information, when the real-time data is received, decrypting the first data using the decryption information, and combining the decrypted, first data with the second data and outputting the content.

The nonreal-time data may comprise first data which is encrypted, and first interoperation information for playback in interoperation with the real-time data, the real-time data may include second data, information about a source which provides decryption information with respect to the first data, and second interoperation information for playback in interoperation with the nonreal-time data, and the method may comprise detecting the information about the source when the real-time data is received, accessing a source which provides the decryption information by using the detected information about source, and decrypting the first multimedia data by using the received decryption information.

The method may additionally comprise generating a reduced image of the nonreal-time data and outputting the reduced image, when a request output of the nonreal-time data is inputted before the time of outputting the real-time data.

In one embodiment of the present invention, a transmitter is provided, which may comprise a data generator configured to generate nonreal-time data comprising non-encrypted, data, a playback restriction indicator and interoperation information, and a transmitter configured to transmit the nonreal-time data to a receiver. The data may be used to construct content in combination with real-time data transmitted from another transmitter, the playback restriction indicator may be an indicator to restrict playback of the data until a time of outputting the real-time data at the receiver, and the interoperation information may be information to interoperate the real-time data with playback of the data.

In another embodiment of the present invention, a transmitter is provided, which may comprise a data generator configured to generate real-time data comprising data, interoperation information and additional information, and a transmitter configured to transmit the real-time data to a receiver. The data is used to constitute content in combination with nonreal-time data transmitted from another transmitter, the interoperation information is information to interoperate the nonreal-time data with playback of the data, and the additional information is one from among decryption information to decrypt the nonreal-time data, playback restriction indicator with respect to nonreal-time data received at a receiver after the real-time data is transmitted, and information about a source which provides the decryption information.

According to various embodiments of the present invention, content is protected, because the nonreal-time data is restricted from being played back until the reception of the real-time data.

BRIEF DESCRIPTION OF THE DRAWINGS

FIG. 4 illustrates an example of nonreal-time data format containing playback restriction indicators;

FIG. 5 illustrates an example of a playback restriction indicator;

FIG. 6 illustrates an example of information so set as to perform restrictive playback;

FIG. 7 illustrates a nonreal-time data format in which a playback restriction indicator is written in PMT;

FIG. 8 illustrates a nonreal-time data format in which a playback restriction indicator is written in EIT;

FIG. 9 illustrates an example of a playback restriction indicator format as written in PMT;

FIG. 18 illustrates an example of a real-time data format containing therein decryption information;

DETAILED DESCRIPTION

Hereinafter, the present invention will be explained in greater detail.

Figure 1:
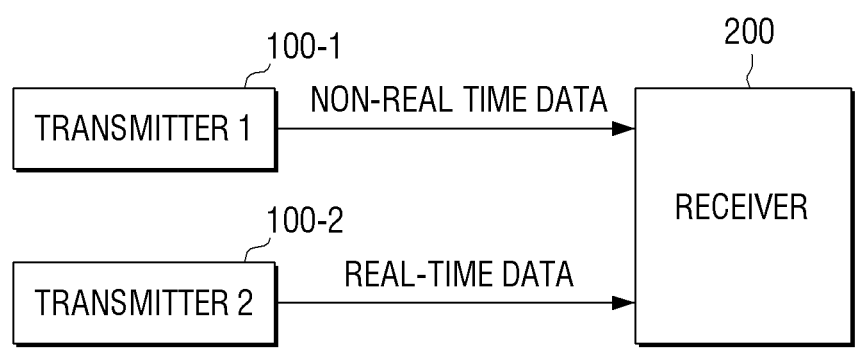
FIG. 1 is a block diagram of a content transmitting and receiving system according to an embodiment of the present invention.

FIG. 1 is a block diagram of a content transmitting and receiving system according to an embodiment of the present invention. Referring to FIG. 1, the content transmitting and receiving system includes a plurality of transmitters 100-1, 100-2 and a receiver 200.

The first and second transmitters 100-1, 100-2 transmit different data signals to different paths from each other. Referring to an example of FIG. 1, the first transmitter 100-1 transmits nonreal-time data, while the second transmitter 100-2 transmits real-time data. The nonreal-time data and real-time data constitute one content. The 'content' as used herein refers to multimedia content such as 3D content or 2D content.

By way of example, for 3D content, left-eye and right-eye images may be transmitted as the first and second data, respectively. Alternatively, the multimedia content may be divided into video data and audio data, motion picture data and subtitle data, or other data and transmitted as the first and second data.

In the case of 3D content that has left- and right-eye images, the data size is relatively larger so that there is a limitation to transmit the two data over one channel. Accordingly, the two types of data are separated and transmitted over different paths from each other.

The receiver 200 may combine the received data and playback multimedia content.

The nonreal-time data may be transmitted in advance of the real-time data. The receiver 200 stores the nonreal-time data when received. Further, playback of the nonreal-time data is restricted until the real-time data is transmitted.

That is, the receiver 200 may not perform playback operation even when there is a request to playback the nonreal-time data. The receiver 200 may generate and display an error message on a screen to inform that the playback is not available.

Alternatively, when a request to playback nonreal-time data is inputted, the receiver 200 may playback only limited data. By way of example, the receiver 200 may playback the nonreal-time data in a reduced size or with reduced resolution, or select and playback in continuous frames, or playback the nonreal-time data for a limited period of time.

Figure 2:
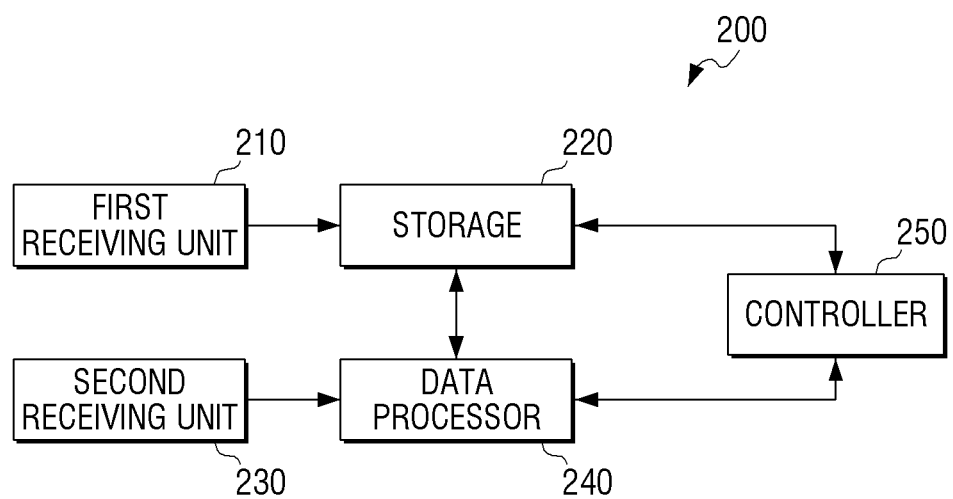
FIG. 2 is a block diagram of a receiver according to an embodiment of the present invention.

FIG. 2 illustrates an example of a receiver 200. Referring to FIG. 2, the receiver 200 includes a first receiving unit 210, a storage 220, a second receiving unit 230, a data processor 240, and a controller 250.

The first receiving unit 210 receives nonreal-time data to constitute multimedia content.

The storage 220 stores the nonreal-time data which is received via the first receiving unit 210. The second receiving unit 230 receives real-time data to constitute the multimedia content.

The data processor 240 detects the nonreal-time data to be interoperated with the real-time data, among the data stored at the storage 220, when the real-time data is received. Whether the data is interoperated or not may be confirmed using interoperation information. The 'interoperation information' refers to information that enables playback to be performed with the real-time data and nonreal-time data interoperated with each other. To be specific, the interoperation information may be implemented as content ID, content title, or a broadcasting time.

The data processor 240 combines the detected nonreal-time data and received real-time data and outputs multimedia content. When the nonreal-time data is left-eye image and real-time data is right-eye image, the data processor 240 may construct 3D content using the left- and right-eye images. The method for constructing 3D content may vary, depending on a 3D display manner. That is, when polarization method is implemented, the data processor 240 may alternately arrange some of the synchronized left- and right-eye images and construct one or two frames. When shutter glass type is implemented, the data processor 240 may alternately arrange the synchronized left- and right-eye images.

In another example, when the nonreal-time data is subtitle data and the real-time data is video and audio data, the data processor 240 decrypts the video and audio data by demultiplexing. Further, the data processor 240 generates a GUI image corresponding to the subtitle data. The data processor 240 generates an image frame by combining the generated GUI image with the video data.

The receiver 200 as explained above may be implemented as an apparatus with a display function, such as, for example, a television, PC, laptop computer, tablet PC, mobile phone, electronic frame, or kiosk. The receiver 200 in this case may include a display panel (not illustrated). In a receiver 200 to playback 3D content, the display panel may be provided with a lenticular lens or parallax barrier. In the case of shutter glass type, the receiver 200 may be additionally provided with a sync signal transmitter (not illustrated). In this case, the display panel may alternately display synchronized left- and right-eye images, and the sync signal transmitter may transmit sync signal to 3D glasses to alternately turn on the left- and right-eye glasses in accordance with the time of displaying left- and right-eye images.

Alternatively, the above receiver 200 may be implemented as a set top box or a data processor chip to receive and process data and provide the resultant data to a display panel or other display device. In this case, the receiver 200 may be additionally provided with an interface (not illustrated) connected to the display panel or other display device.

The controller 250 controls the data processor 240 to restrict output of nonreal-time data until the time at which real-time data is received and outputted.

In one embodiment, the nonreal-time data received at the first receiving unit 210 includes non-encrypted, first multimedia data, playback restriction indicator, or first interoperation information. The 'playback restriction indicator' refers to a code which instructs to restrict the playback of the first multimedia data until the output time of the real-time data. The 'first interoperation information' refers to information to playback with interoperation with real-time data.

The real-time data received at the second receiving unit 230 includes second multimedia and second interoperation information to playback with interoperation with the real-time data.

The first and second multimedia data refers to data to constitute one multimedia content. As explained above, in the case of 3D content, the first multimedia data may be one of the left- and right-eye images, while the second multimedia data may be the other of the left- and right-eye images. In the case of motion picture content, the first multimedia data may be one of audio and video data, while the second data may be the other one. Alternatively, the first multimedia data may include audio and video data corresponding to part of motion picture content, while the second multimedia data may be audio and video data corresponding to the rest of the motion picture content. As explained above, the first and second multimedia data may be generated as part of the data to constitute one multimedia content. Referring to FIGS. 1 and 2, two multimedia data may be transmitted, although a plurality of nonreal-time data may be transmitted.

The controller 250 may control the operation of the data processor 240 according to the playback restriction indicator written in the nonreal-time data. When the playback is restricted according to the playback restriction indicator, the controller 250 may disregard a command to playback nonreal-time data and refuse to playback.

The playback restriction indicator may be set to 0 or 1 to instruct whether the playback is restricted or allowed.

Alternatively, the playback restriction indicator may be information that defines a time condition to restrict the playback. That is, when the real-time data is scheduled to be played on December 10, 10:00 P.M., the playback restriction indicator may record therein such time information. The controller 250 checks the time information included in the playback restriction indicator and controls the data processor 240 to restrict the playback of the nonreal-time data until that time.

Alternatively, the playback restriction indicator may be condition that defines so that the playback is restricted until the real-time data is played back. In this case, the controller 250 may restrict the playback of nonreal-time data for a indefinite period of time until the real-time data is played back.

Meanwhile, according to other embodiments, the controller 250 may encrypt the nonreal-time data and store the same at the storage 220, when the playback restriction indicator recorded on the nonreal-time data is set to restrict the playback of nonreal-time data. Accordingly, stricter playback restriction is possible. According to an embodiment, the receiver 200 may additionally include an encryption/decryption module. The encryption/decryption module may encrypt nonreal-time data using various known encryption/decryption algorithms and decrypt the nonreal-time data upon playback.

Meanwhile, according to another embodiment, when the playback is restricted according to the playback restriction indicator, the controller 250 may playback nonreal-time data in a changed version rather than in original version, in response to an input of a command to playback nonreal-time data. The changed version may include various versions including a version with reduced size or resolution, a version of capturing image at random time intervals, a data version written separately as a preview, or a version for playback for a limited period of time.

At least one of the playback restriction indicator and the first interoperation information may be transmitted in various forms to the receiver 200. For example, at least one of the playback restriction indicator and the first interoperation information may be recorded on one of program map table (PMT), the event information table (EIT), a reserved area, an extension field area, a new field area, or maybe provided by a private stream having independent packet identifier (PID).

Meanwhile, in another embodiment of the present invention, the playback restriction indicator may be included in the real-time data and transmitted. That is, before receiving real-time data for interoperation with nonreal-time data, the second receiver 230 may receive preceding real-time data containing a playback restriction indicator with respect to the nonreal-time data. The preceding real-time data may include a playback restriction indicator with respect to nonreal-time data to be received afterward. The controller 250 may detect the playback restriction indicator included in the preceding real-time data and control the data processor 240 to restrict the playback of the nonreal-time data according to the detected value. Since the manner of using the playback restriction indicator and types thereof may be implemented similarly as the embodiments explained above, these will not be explained in detail for the sake of brevity.

Meanwhile, in another embodiment of the present invention, the nonreal-time data may include encrypted first multimedia data and first interoperation information, and real-time data may include second multimedia data, decryption information for the first multimedia data and second interoperation information.

That is, the first transmitter 100-1 may encrypt the first multimedia data to prevent the user from playing it back arbitrarily, and transmit the nonreal-time data. Since the controller 250 and the data processor 240 do not have decryption information for the encrypted, first multimedia data, playback is impossible even when there is a user's request for playback.

The decryption information for use in encryption of the first multimedia data may be included in the real-time data and transmitted.

The controller 250 detects the decryption information when the real-time data is received. The controller 250 decrypts, i.e., demodulates the first multimedia data using the detected decryption information.

The data processor 240 may construct multimedia content by combining the decrypted, first multimedia data and second multimedia data. The decryption information may be information about encryption algorithm applied to the first multimedia data, or a key used for encryption.

The controller 250 may decrypt using the decryption algorithm stored at the storage 220. There may be a plurality of decryption algorithms. When the decryption information relates to an encryption algorithm, the controller 250 may select the decryption algorithm corresponding to the decryption algorithm to perform decryption process.

Alternatively, when the key used in the encryption is included in the decryption information, the controller 250 may process decryption using the key.

Since the methods of encryption and decryption may use known algorithms, detailed description thereof will be omitted for the sake of brevity.

Furthermore, since the types of first and second multimedia data and types of first and second interoperation information may be implemented similarly to the other embodiments explained above, these also will not be explained in detail for the sake of brevity.

In yet another embodiment of the present invention, the decryption information may be provided from an external source, rather than it being real-time data. That is, an external source such as encryption verification server may provide the decryption information via an IP network, rather than a broadcast network. In this example, the real-time data may include information about the source that provides the decryption information. The controller 250 may detect the information about the source, access the corresponding source and receive the decryption information. Accordingly, the nonreal-time data is decrypted using the received decryption information, and the decrypted data and real-time data are combined to reproduce multimedia content.

The real-time data and nonreal-time data may respectively include sync information for frame synchronization with each other. The sync information may include various information. To be specific, the sync information may include at least one of content start information which indicates the starting point of the multimedia content, a time stamp difference value between first and second multimedia data, a frame index, time code information, UTC information, and frame count information.

Under MPEG specification, the transport stream to transmit broadcast data may include a program clock reference (PCR) and a presentation time stamp (PTS).

The PCR may refer to reference time information for the receiver (e.g., set top box, TV) under an MPEG specification which matches time reference to that of the transmitter. The receiver matches the system time clock (STC) according to PCR. The PTS is the time stamp that informs the playback time for synchronization of video and audio at a broadcast system. As used herein, this is referred to as 'time stamp'. The real-time data and nonreal-time data may have different PCRs, as these are transmitted from different transmitters 100-1, 100-2, and also have a different time for transmission. Accordingly, the respective data may include various types of sync information explained above.

When sync information is provided, the controller 250 may use the sync information to search the frames to be synchronized and adapt time stamps accordingly, or directly compare the frame index or time codes and control the data processor 240 to playback matching frames together.

As explained above, depending on embodiments, the content included in nonreal-time data may be non-encrypted or encrypted, and the playback restriction indicator may also be included in the nonreal-time data or real-time data. A representative embodiment may be tabulated as follows.

TABLE 1

| | Nonreal-time data | | |
|---|---|---|---|
| | A/V data | Additional data | Real-time data |
| 1 | Non-encrypted | Playback restriction indicator 1st interoperation info. | 2nd interoperation info. |
| 2 | Non-encrypted | 1st interoperation info. | 2nd interoperation info. playback restriction indicator |
| 3 | Encrypted | 1st interoperation info. | Decryption info. 2nd interoperation info. |
| 4 | Encrypted | 1st interoperation info. | 2nd interoperation info. source info. |

In various embodiments, the real-time data or nonreal-time data may not be limited to any of the radio frequency (RF) signal transmitted over a broadcast network or a data packet transmitted over the Internet, but may be transmitted in various forms.

Hereinbelow, a method for processing real-time data and nonreal-time data and a method for transmitting various additional information according to various embodiments will be explained in greater detail.

Figure 3:
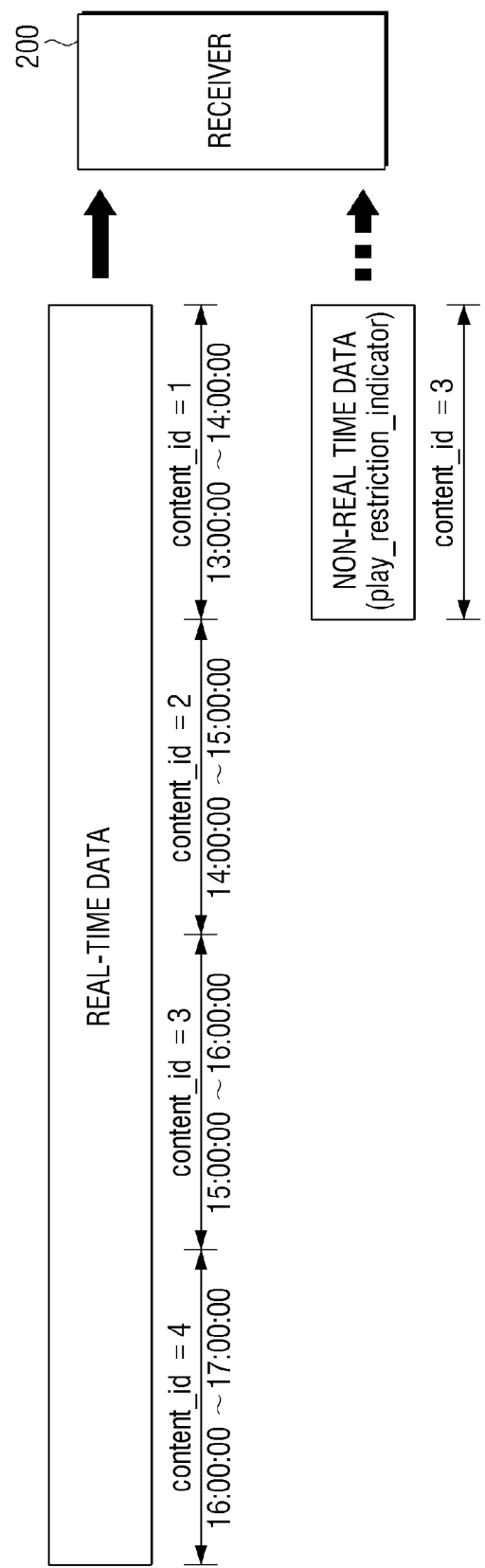
FIG. 3 illustrates nonreal-time data and real-time data including playback restriction indicators.

FIG. 3 is a view provided to explain a method for processing real-time data and nonreal-time data according to a first embodiment of Table 1 of the present invention.

Referring to FIG. 3, the nonreal-time data with content ID 3 is received at the receiver 200 at a similar timing as the real-time data with content ID 1. That is, the nonreal-time data with content ID 3 is received two hours earlier than the real-time data with the same content ID number. The nonreal-time data includes a playback restriction indicator (play_restriction_). The receiver 200 restricts playback of the nonreal-time data until a specific time according to play_restriction_indicator. Various methods may be implemented to restrict the playback. That is, the data may be played back under limited condition or alternatively, playback may not be performed at all despite of a request for playback. Alternatively, the receiver 200 may itself encrypt the nonreal-time data and store the same to basically prevent playback. The receiver 200 decrypts the encrypted nonreal-time data and processes the real-time data at a time of receiving the real-time data with the same content ID which includes second interoperation information.

FIG. 4 is a view provided to explain a method for transmitting a playback restriction indicator in the nonreal-time data, according to a first embodiment. As explained above, the playback restriction indicator may be recorded in a specific descriptor within the nonreal-time data, or provided in a form of a private stream having an independent PID.

FIG. 4 illustrates an example in which additional information such as playback restriction indicator is recorded on rc_descriptor( ) within PMT or EIT.

Referring to FIG. 4, program_protection_information( ) of the nonreal-time data may include playback restriction indicator (play_control_code) and playback restriction condition (play_condition( )) regions provided therein. The playback restriction indicator may be 2 bits, and the playback restriction condition may be 8 bits.

FIG. 5 illustrates an example of playback restriction indicator. Referring to FIG. 5, the playback restriction indicator may be defined as one of code values such as 00, 01, 10, 11. '00' represents that the first multimedia data within nonreal-time data is in non-encrypted state, and that playback is restricted. '10' represents that the first multimedia data is in encrypted state and that the playback is restricted. '11' is left in reserved state. Depending on embodiment, '10' may also be left as reserved.

FIG. 6 illustrates an example of the playback restriction condition. The 'playback restriction condition' refers to a condition set for performing playback to limited extent, when a request for playback is inputted before the nonreal-time data is allowed to be played back. Referring to FIG. 6, the playback restriction condition includes allowed_max_resolution and pre_playable_time.

allowed_max_resolution represents maximum resolution of the nonreal-time data which is played back when a request for playback is inputted before the time the playback is allowed. That is, while the HD nonreal-time data is played with HD resolution after the time the playback is allowed, this may be displayed in reduced resolution image in accordance with the maximum resolution as defined by allowed_max_resolution.

pre_playable_time represents a time limit, i.e., the time duration for playback in which the nonreal-time data is allowed to be played back in response to a request for playback which is inputted before the time the playback is allowed.

When pre_playable_time is set to 1 min, and when a request for playback is inputted before the time playback is allowed, the nonreal-time data is played back for only 1 min.

The playback restriction condition may include many conditions other than those explained above. For example, the playback restriction condition may include size reduction, a capture time interval, or identification information about data made for preview.

FIG. 7 illustrates various locations at which the playback restriction indicator may be recorded in PMT. Referring to FIG. 7, the playback restriction indicator may be provided via the reserved areas or new descriptors at various locations within PMT, or an extension area of the existent descriptor.

FIG. 8 illustrates various locations at which the playback restriction indicator may be recorded in EIT. Referring to FIG. 8, the playback restriction indicator may be provided via the reserved areas or new descriptors at various locations within EIT, or an extension area of the existent descriptor.

Alternatively, the playback restriction indicator may be provided via a separate stream (stream_type=0x05) such as a private stream, or by a predefined metadata providing method (stream_type=0x15~0x19).

FIG. 9 illustrates an example of a playback restriction indicator format recorded in PMT according to a first embodiment. The playback restriction indicator of FIG. 9 may be recorded in descriptor( ) of FIG. 7. Referring to FIG. 9, the playback restriction indicator may include content ID (contented), restriction level (restriction_level), preliminarily playable time (pre_playable_time), or maximum allowed resolution (allowed_max_resolutION). The content ID corresponds to the interoperation information to interoperate the real content and non content, and restriction level information refers to information that varies a degree of restriction by defining grades according to locations, ages, or unit rates. pre_playable_time refers to information which randomly sets time duration for which no data is playable preliminarily, and allow_max_resolution refers to maximum resolution applied to nonreal-time data during preliminary playback. allow_max_resolution may be set to be less than the original resolution.

Figure 10:
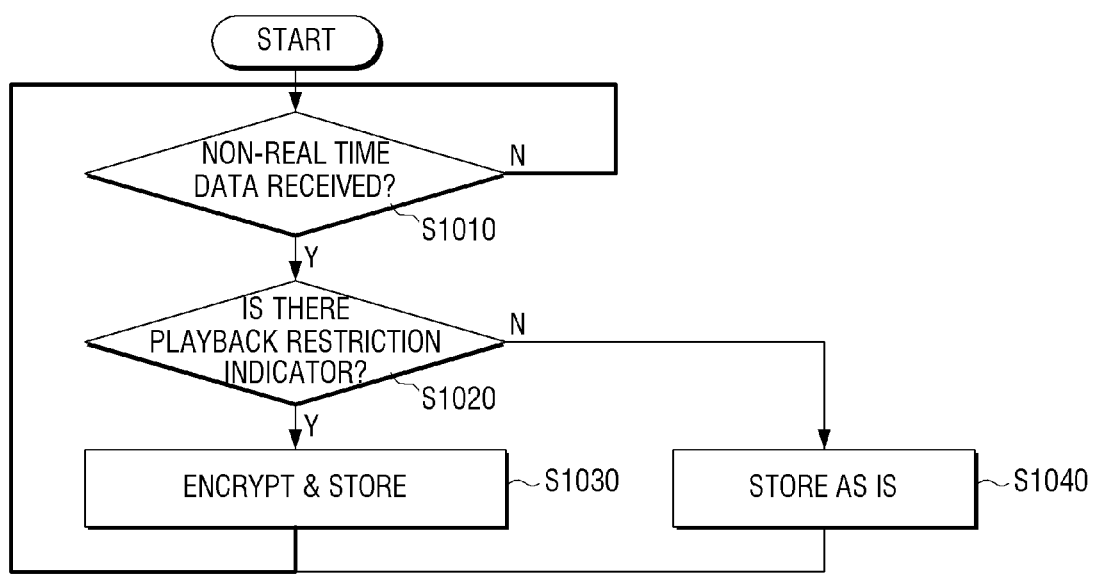
FIG. 10 is a flowchart provided to explain a method for restricting playback of nonreal-time data according to a playback restriction indicator.

FIG. 10 is a flowchart provided to explain a method for processing nonreal-time data according to the first embodiment. Referring to FIG. 10, at S1010, when there is nonreal-time data to be received at a receiver, at S1020, it is determined whether the nonreal-time data includes therein playback restriction indicator or not.

When there is playback restriction indicator, at S1030, the nonreal-time data is encrypted according to the indicator, while, when there is no playback restriction indicator, at S1040, the nonreal-time data is stored as is. The nonreal-time data stored without being encrypted may be played back on user's request. Meanwhile, the nonreal-time data may be stored as is when there is playback restriction indicator but it is set to non-restricted status. Although FIG. 10 illustrates an example in which playback is restricted using encryption, it will be appreciated that the playback may be restricted in various methods other than those explained above.

Figure 11:
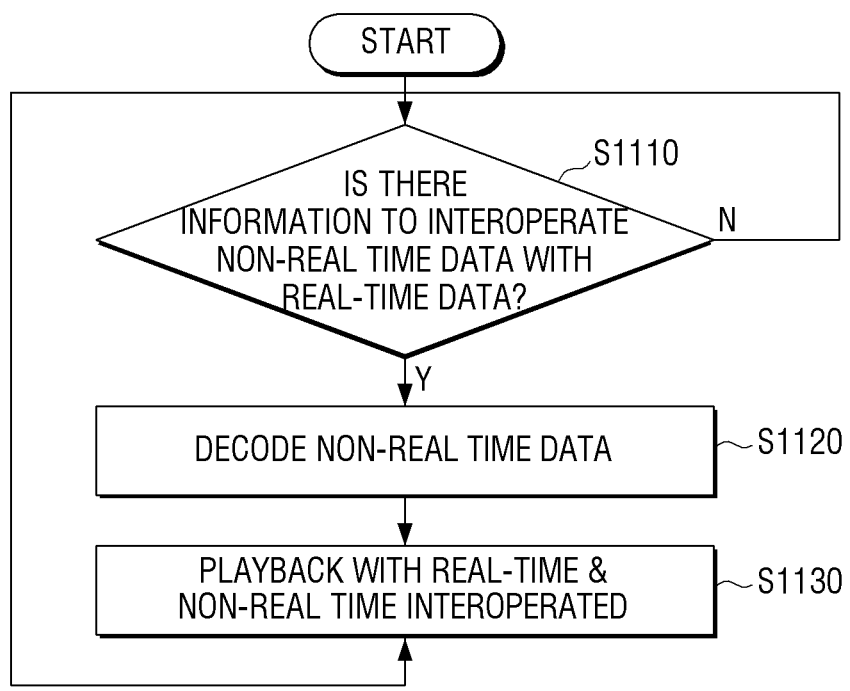
FIG. 11 is a flowchart provided to explain a method for playing back in interoperation with the nonreal-time data after reception of real-time data.

FIG. 11 is a flowchart provided to explain a method for processing data when real-time data is received, according to the first embodiment. Referring to FIG. 11, at S1110, it is determined whether the real-time data includes therein interoperation information for interoperation with nonreal-time data or not. At S1120, when determining that the interoperation information exists as a result of the determination, at S1120, the stored nonreal-time data is decrypted. Since the receiver itself encrypts the nonreal-time data, decryption information such as key values for the decryption may not be necessary. At S1130, the decrypted nonreal-time data and real-time data are interoperated and played back.

Figure 12:
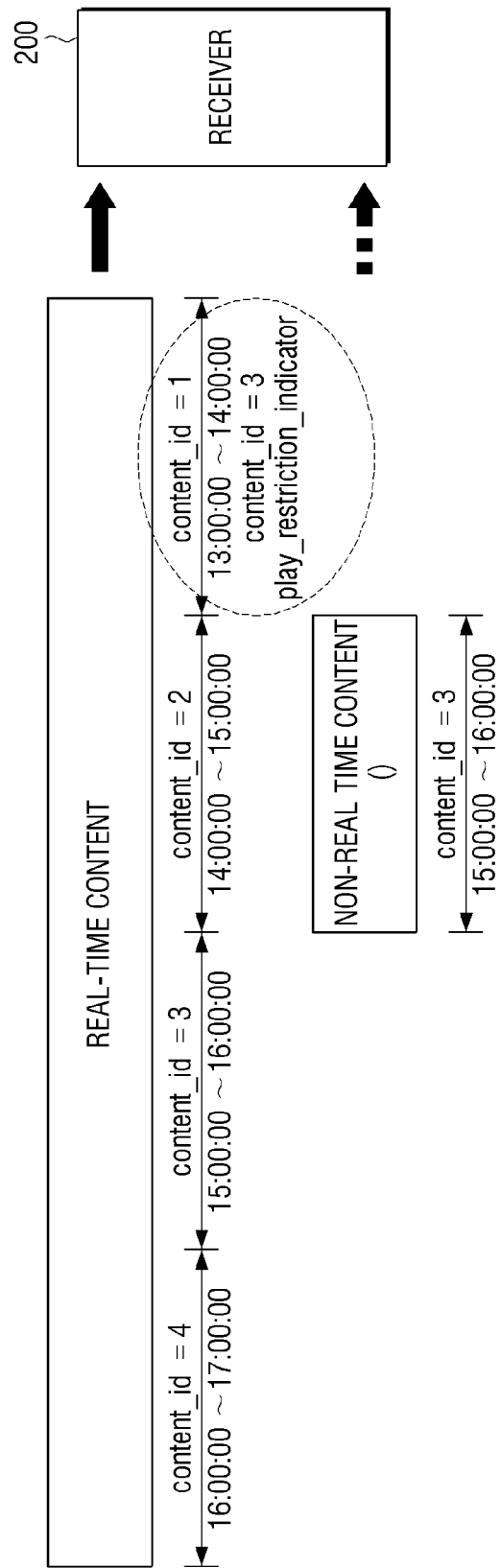
FIG. 12 illustrates an embodiment of providing playback restriction indicator using prior real-time data.

FIG. 12 is a view provided to explain an operation of a receiver according to a second embodiment. Referring to FIG. 12, among the preceding real-time data which is transmitted before the nonreal-time data, the real-time data area with content ID 1 may include playback restriction indicator (play_restriction_indicator). The playback restriction indicator may include information about nonreal-time data for which playback is restricted. Referring to FIG. 12, information content_id=3 is transmitted along, thereby indicating that the playback of nonreal-time data with content_id 3 be restricted. After that, the nonreal-time data is transmitted to the receiver 200 without being encrypted. The receiver 200 may restrict the playback of the nonreal-time data according to the playback restriction indicator recorded on the preceding real-time data portion. The playback restriction may be implemented in various manners as explained above. The receiver 200, when receiving real-time data with content ID 3, withdraws playback restriction with respect to nonreal-time data and interoperates nonreal-time data and real-time data to playback the data.

Figure 13:
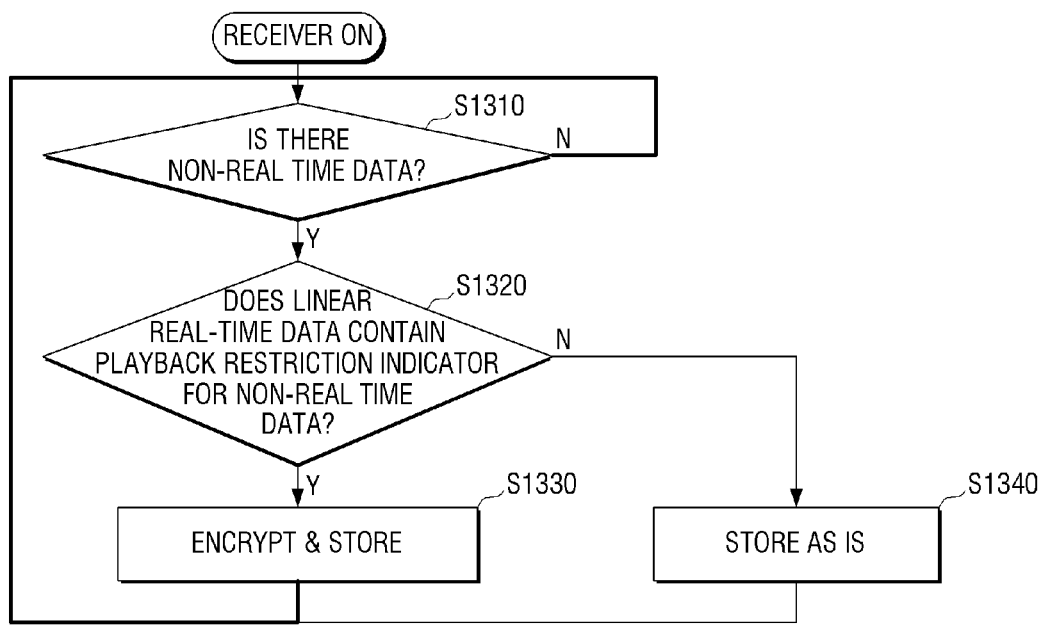
FIG. 13 is a flowchart provided to explain a method for restricting playback of nonreal-time data according to the embodiment of FIG. 12.

FIG. 13 is a flowchart provided to explain a method for processing nonreal-time data according to the second embodiment. Referring to FIG. 13, at S1310, when nonreal-time data is received, at S1320, it is determined whether any of the preceding data provided in real-time basis includes playback restriction indicator with respect to nonreal-time data. When there is, at S1330, the nonreal-time data is encrypted and stored, and when there is not, at S1340, the nonreal-time data is directly stored without being encrypted. Although the encryption is used as one way to restrict playback in an embodiment illustrated in FIG. 13, it will be appreciated that the playback can be restricted in various manners other than those explained above.

Figure 14:
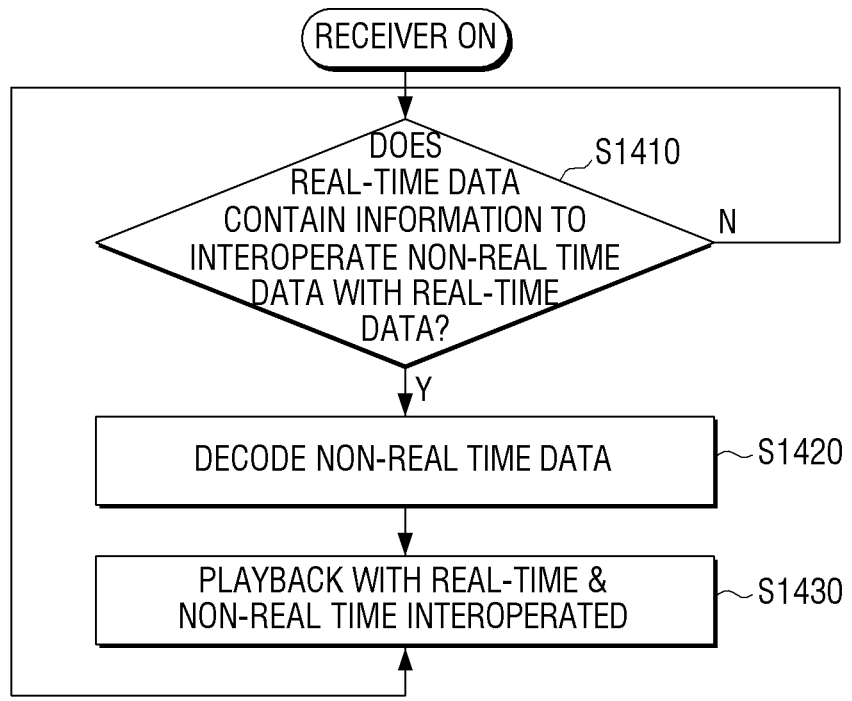
FIG. 14 is a flowchart provided to explain a method for playing back in interoperation with nonreal-time data after reception of the real-time data according to the embodiment of FIG. 12.

FIG. 14 is a flowchart provided to explain a method for processing when real-time data is received, according to the second embodiment. Referring to FIG. 14, at S1410, the receiver determines if there is interoperation information for interoperation with nonreal-time data in the nonreal-time data. When the result of determination indicates the presence of the interoperation information, at S1420, the interoperable nonreal-time data among the stored nonreal-time data is decrypted. At S1430, the decrypted nonreal-time data and real-time data are interoperated and thus, playback is performed.

Figure 15:
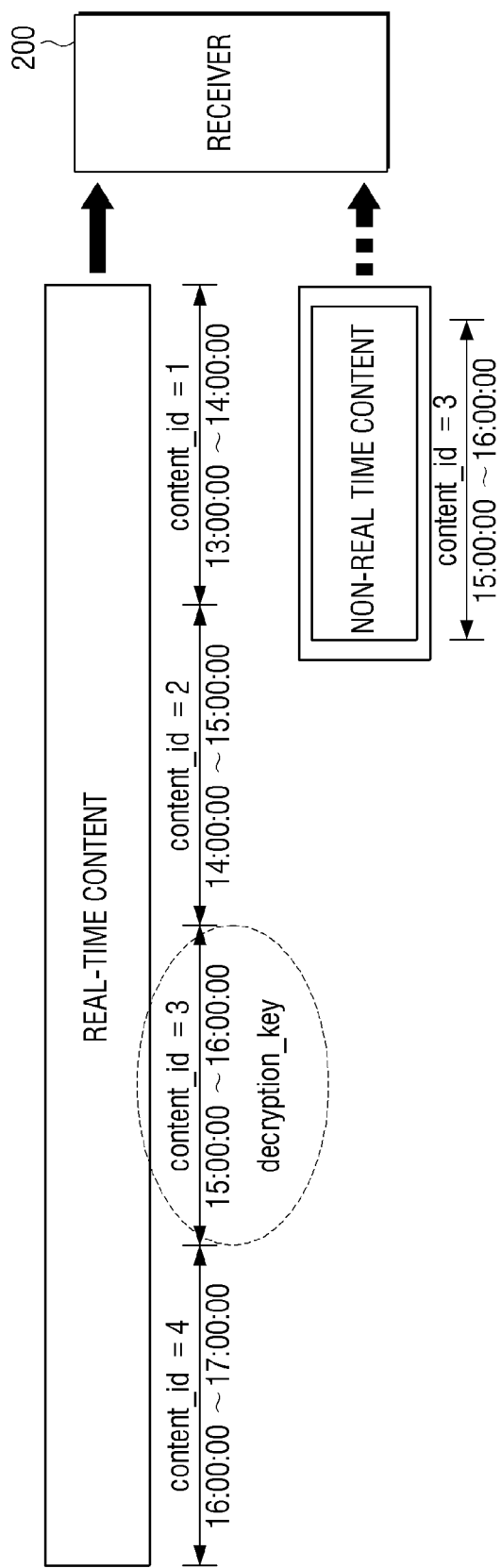
FIG. 15 illustrates an embodiment of using real-time data containing decryption information therein.

FIG. 15 is a view provided to explain an operation of the receiver according to a third embodiment. Referring to FIG. 15, the nonreal-time data is encrypted before the playback time and transmitted. The real-time data, which interoperates with the nonreal-time data, includes therein decryption information (decryption_key) used for decryption the nonreal-time data.

The receiver 200 compares the interoperation information between the real-time data and nonreal-time data, and when the information matches, decrypts the nonreal-time data using the decryption information included in the real-time data, and interoperates and plays the data.

Figure 16:
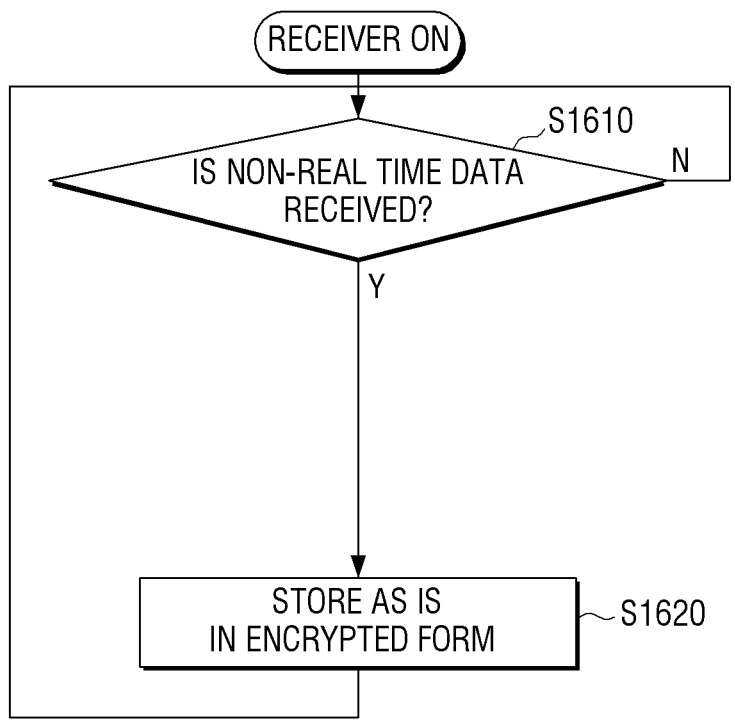
FIG. 16 is a flowchart provided to explain a method for processing nonreal-time data according to the embodiment of FIG. 15.

FIG. 16 is a flowchart provided to explain a method for processing nonreal-time data at a receiver, according to a third embodiment. Referring to FIG. 16, at S1610, when nonreal-time data is received at the receiver 200, at S1620, the receiver 200 stores the data as is, i.e., in the encrypted state.

Figure 17:
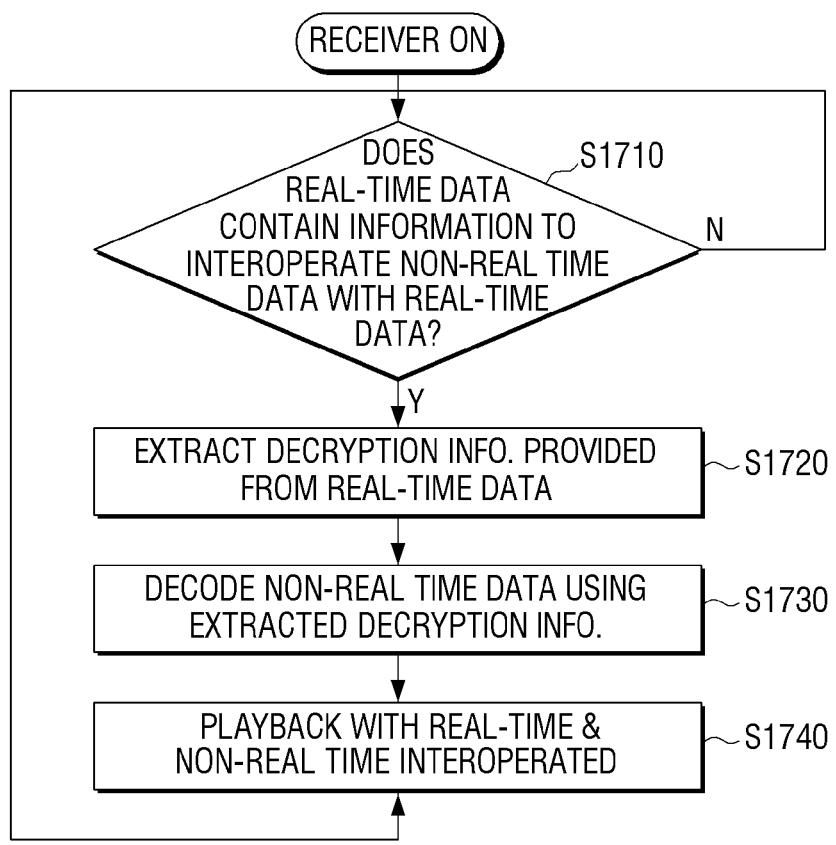
FIG. 17 is a flowchart provided to explain processing after reception of real-time data according to the embodiment of FIG. 15.

After that, when real-time data is received, at S1710, the receiver 200 determines if the real-time data has interoperation information with respect to nonreal-time data as illustrated in FIG. 17. At S1720, if the determination indicates that the interoperation exists, the receiver 200 extracts decryption information as provided from the real-time data. At S1730, the receiver decrypts the nonreal-time data using the extracted decryption information, and S1740, interoperates the decrypted nonreal-time data and real-time data and plays back the data.

The decryption information may be recorded and provided at various locations within the real-time data. To be specific, the decryption information may be provided via the reserved areas or new descriptors within PMT, or extension area of the existent descriptor. The decryption information may also be provided via the reserved areas or new descriptors within EIT, or extension area of the existent descriptor, or via the reserved areas or new descriptors within conditional access table (CAT), or extension area of the existent descriptor. Alternatively, the decryption information may be provided via a separate stream (stream_type=0x05) such as private stream, or by a predefined metadata providing method (stream_type=0x15~0x19).

FIG. 18 illustrates an example of a method for providing decryption information. Referring to FIG. 18, the decryption information may be recorded in reserved areas of PMT within real-time data or specific descriptor, along with interoperation information. Referring to FIG. 18, content_labeling_description( ) represents interoperation information, and content_decryption_descriptor( ) represents decryption information. content_decryption_descriptor( ) may include key value (decryption_key) for the decryption.

Figure 19:
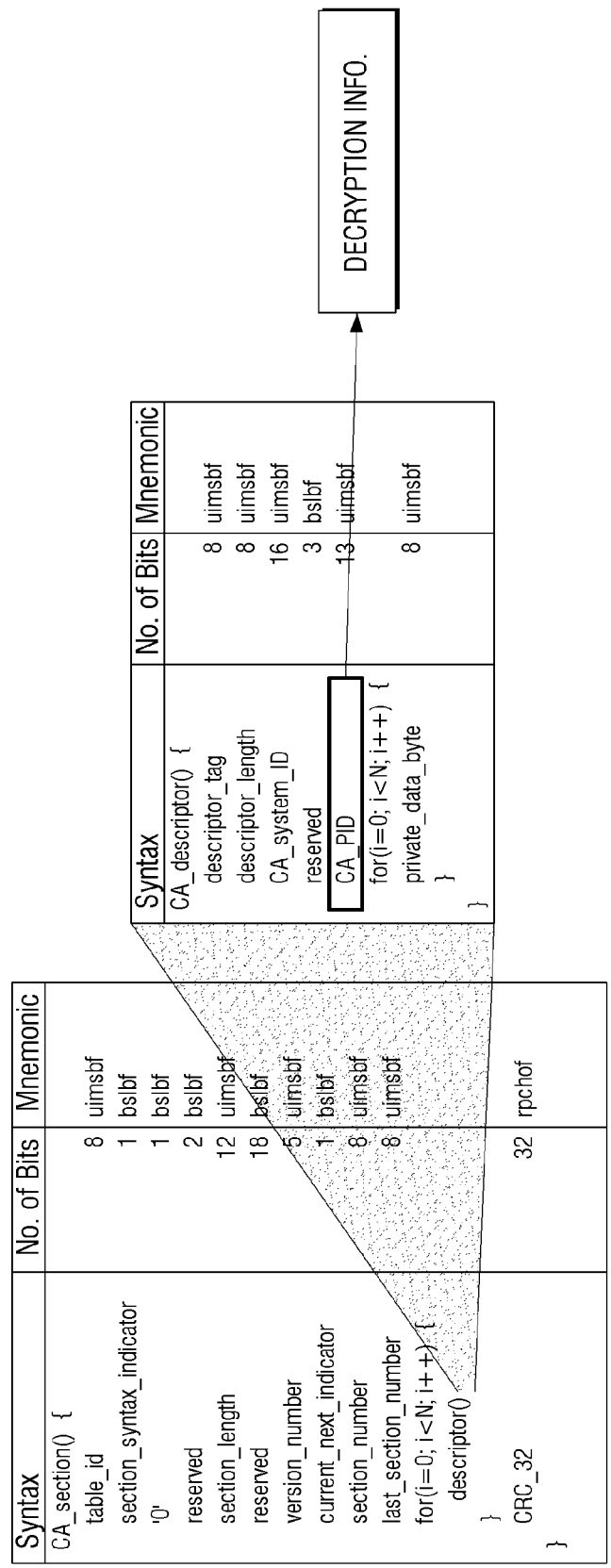
FIGS. 19 and 20 illustrate other examples of the real-time data format containing therein the decryption information.

FIG. 19 illustrates an embodiment of providing decryption information using CAT. Referring to FIG. 19, the PID of the stream including decryption information may be referenced using predefined CA_descriptor( ) in the CAT. The receiver 200 may extract the decryption information from the stream with corresponding PID and use the same for the decryption of nonreal-time data.

Figure 20:
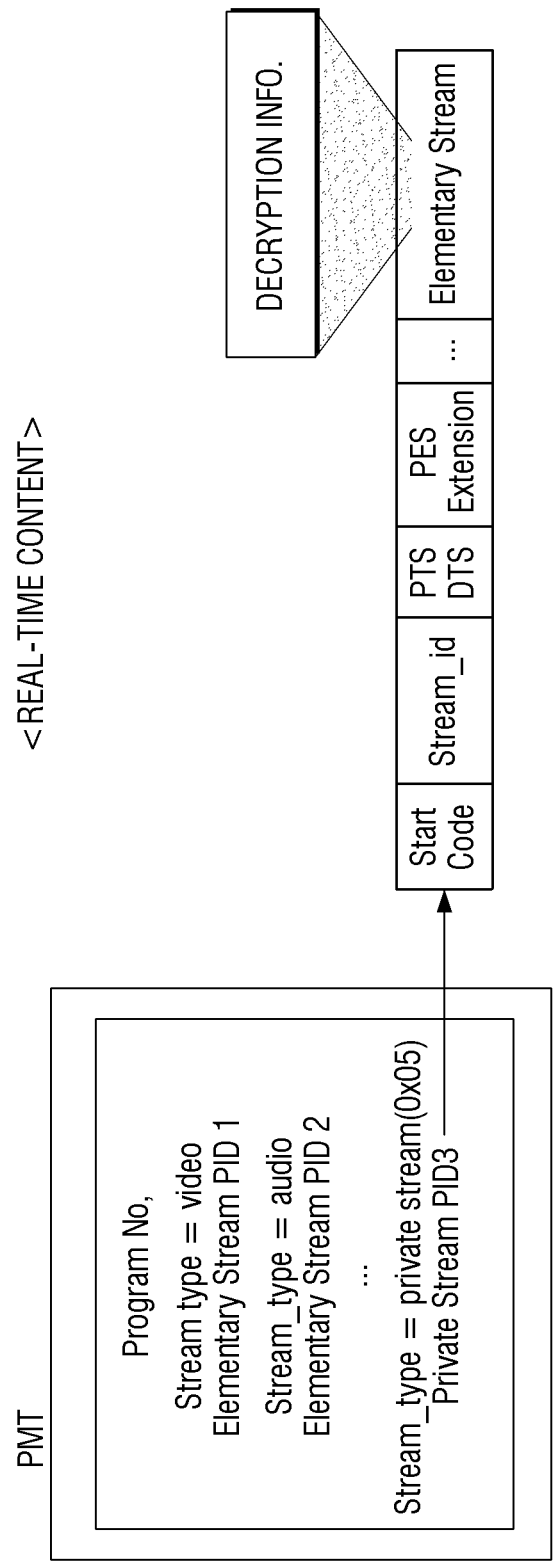

FIG. 20 illustrates an embodiment of providing decryption information using a private stream. Referring to FIG. 20, the decryption information may be provided via a private stream (stream_type=0x05), which is separately defined, other than video, audio or data stream. The private stream may be synchronized with the video, audio, or data streams within the real content, by using PTS or DTS, and provided. As a result, an accurate time for decryption may be signaled.

While not illustrated separately, the decryption information may be provided via a metadata stream such as stream_type=0x15~0x19. The metadata stream is defined separately from the video, audio or data streams, and may be provided in synchronization with these streams using PTS or DTS. Accordingly, accurate time for decryption can be signaled.

Figure 21:
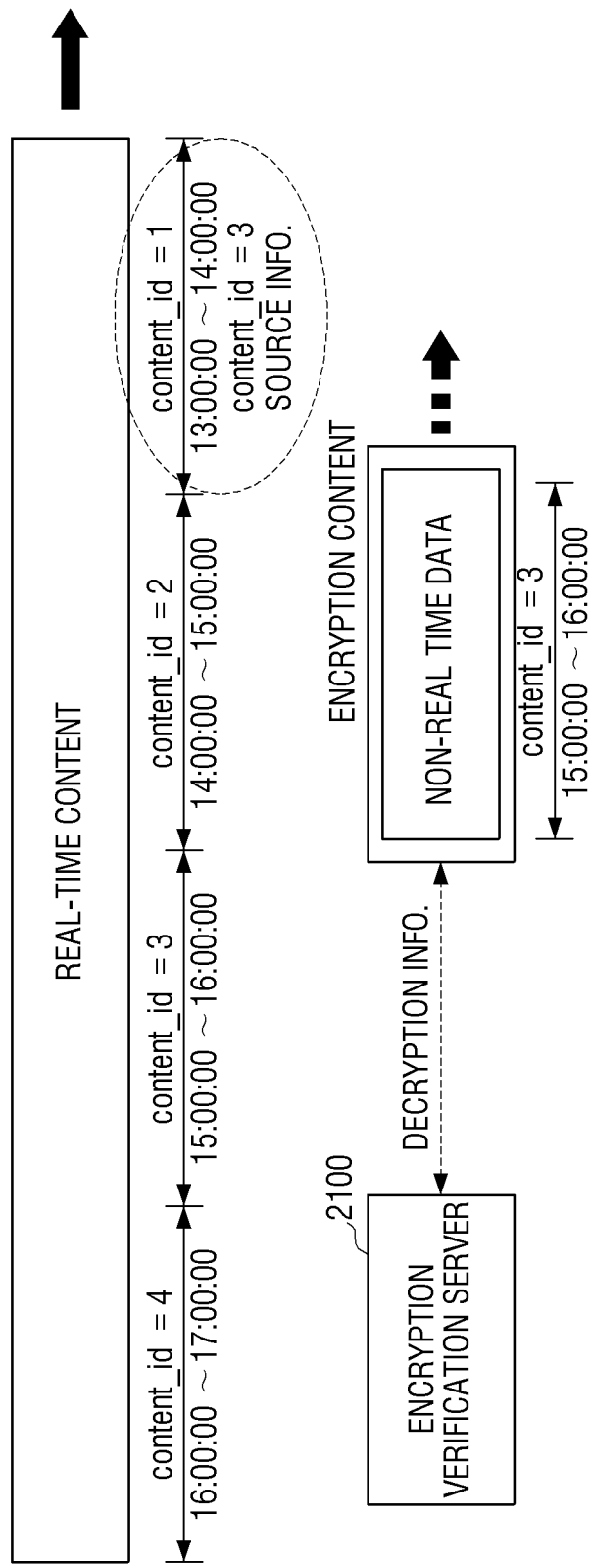
FIG. 21 is a view provided to explain processing of nonreal-time data using encryption verification server, according to yet another embodiment of the present invention.

FIG. 21 is a view provided to explain an operation of a receiver according to a fourth embodiment. Referring to FIG. 21, the real-time data may include source information. The source information may be included in the preceding real-time data received in advance of the nonreal-time data as illustrated in FIG. 21, or alternatively, may be included in the real-time data for interoperation with the nonreal-time data.

When the source information is included in the preceding real-time data, the source information may include playback restriction indicator to indicate that the playback of the nonreal-time data be restricted until a specific time.

The 'source information' refers to information about a source which provides decryption information to decrypt the nonreal-time data. The receiver 200 may use the source information to access an external source, i.e., encryption verification server 2100 and acquire decryption information, and decrypt the nonreal-time data using the decryption information. The receiver 200 may interoperate the decrypted nonreal-time data with real-time data and play back the same.

As explained above, playback of the nonreal-time data is restricted until normal playback timing comes and the real-time data is received. The playback restriction may be implemented, as explained in various embodiments, using a playback restriction indicator, decryption information or source information. The status of playback restriction may also vary depending on playback restriction conditions.

Figure 22:
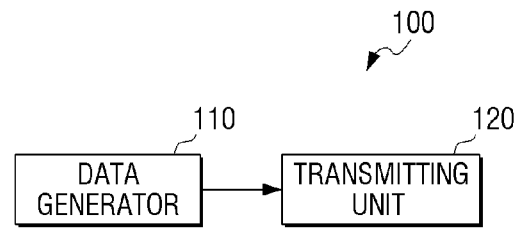
FIG. 22 is a block diagram of a transmitter according to an embodiment of the present invention.

FIG. 22 is a block diagram of a transmitter according to a first embodiment. Referring to FIG. 22, the transmitter 100 may include a data generator 110 and a transmitting unit 120. The transmitter 100 illustrated in FIG. 22 may be used as a first transmitter 100-1 to transmit nonreal-time data in the system illustrated in FIG. 1.

The data generator 110 generates nonreal-time data including non-encrypted multimedia data, playback restriction indicator and interoperation information. The 'multimedia data' as used herein refers to data to construct multimedia content along with the real-time data transmitted from another transmitter. The 'playback restriction indicator' refers to an indicator to restrict the playback of the multimedia data until a time for outputting real-time data at a receiver, and the 'interoperation information' as used herein refers to information to interoperate the playback of the real-time data and multimedia data.

When the multimedia data is inputted from the source, the data generator 110 encodes the inputted multimedia data and multiplexes with the additional information such as the playback restriction indicator and interoperation information. The playback restriction indicator and interoperation information may be recorded in PMT or EIT area. Alternatively, the above information may be recorded in any of the reserved area, extended field area, and new field area, or on a private stream having independent PID. Since the manner or format of recording the respective information has been explained in detail with reference to the accompanying drawings, redundant explanation thereof will be omitted for the sake of brevity.

After being multiplexed at the data generator 110, the data is provided to the transmitting unit 120. The transmitting unit 120 performs various signal processing in conformity with the broadcast standards and transmits nonreal-time data to the receiver. For example, when the transmitter 100 is a broadcast transmitter which transmits a broadcast signal over a broadcast network, the transmitting unit 120 may be implemented to include an RS encoder, an interleaver, a Trellis encoder, or a modulator. Alternatively, when the transmitter 100 is implemented as a web server which transmits streams over a network such as the Internet, the transmitting unit 120 may be implemented as a network interface module which communicates with a receiver, i.e., with a web client according to HTTP protocol.

In one embodiment, the other transmitters may construct a transport stream containing therein real-time data and interoperation information and transmit the same.

Meanwhile, according to a second embodiment, the transmitter 100 may transmit the nonreal-time data that does not include playback restriction indicator. In this case, when the other transmitter constructed as illustrated in FIG. 22 transmits real-time data, the data generator 110 of the other transmitter may generate real-time data that contains playback restriction indicator with respect to the nonreal-time data that will be received later. Accordingly, the transmitting unit 120 may transmit the real-time data containing playback restriction indicator in advance of the nonreal-time data.

FIG. 22 may be configured in the same manner in a third or fourth embodiment. According to the third embodiment, the nonreal-time data is encrypted and transmitted, and the real-time data including therein decryption information may be transmitted. In this case, the transmitter for transmitting real-time data may be configured in the similar manner as illustrated in FIG. 22.

Accordingly, the data generator 110 generates real-time data containing multimedia data, decryption information and interoperation information therein. The 'multimedia data' as used herein refers to real-time data to constitute multimedia content in combination with the encrypted nonreal-time data that is transmitted from the other transmitter. The 'decryption information' refers to information to decrypt the nonreal-time data at a receiver, and the 'interoperation information' refers to information to interoperate playback of the nonreal-time data and multimedia data.

The data generator 110 may receive the decryption information and interoperation information from an external source and multiplex this with the multimedia data.

The transmitting unit 120 transmits the generated real-time data to the receiver. Because the detailed structure and operation of the transmitting unit 120 is explained above, redundant explanation thereof will be omitted for the sake of brevity.

Meanwhile, according to the fourth embodiment, when the transmitter for transmitting real-time data is configured as illustrated in FIG. 22, the data generator 110 may generate real-time data that contains interoperation information and source information. The transmitting unit 120 may transmit the real-time data including source information or the like to the receiver 200 so that the receiver 200 acquires decryption information using the source information.

As explained above, according to various embodiments of the present invention, the transmitter for transmitting nonreal-time data may transmit the non-encrypted data along with playback restriction indicator, or the transmitter for transmitting real-time data may transmit real-time data including therein additional information. The 'additional information' as used herein may be any of the decryption information to decrypt the nonreal-time data, playback restriction indicator with respect to nonreal-time data received at the receiver after the transmission of the real-time data, and information about source that provides decryption information.

Figure 23:
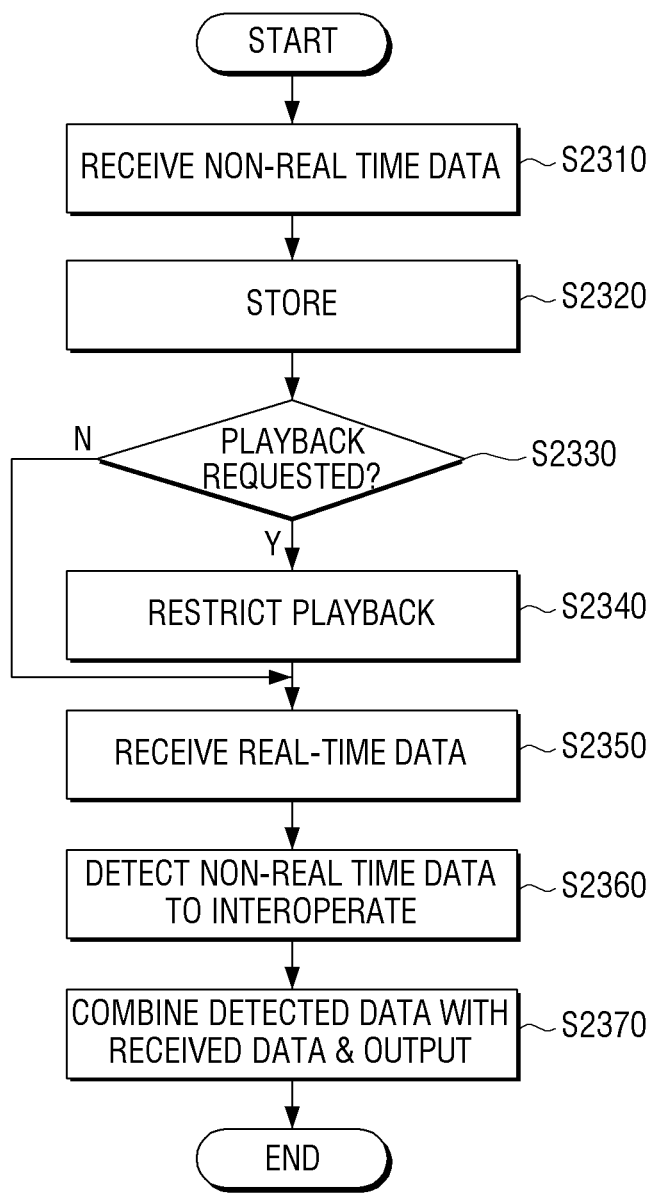
FIG. 23 is a flowchart provided to explain a method for processing content according to an embodiment, in which the playback of the restricted nonreal-time data is controlled according to the playback restriction indicator.

FIG. 23 is a flowchart provided to explain a method for processing content of a receiver, according to a first embodiment. Referring to FIG. 23, at S2310, when nonreal-time data is received, at S2320, the data is stored. Accordingly, the playback restriction indicator included in the nonreal-time data is checked and whether or not to play is determined.

When the playback restriction indicator sets playback restriction, at S2330, even when a request for playback is inputted, at S2340, the receiver restricts playback. The 'playback restriction' may include deferred playback despite the request for playback, or limited playback of nonreal-time data in an altered form from the original nonreal-time data form. Further, the 'playback restriction' may include encrypting the nonreal-time data and storing the same.

After that, at S2350, when real-time data is received, at S2360, nonreal-time data for interoperative playback with real-time data is detected, and at S2370, the detected nonreal-time data and real-time data are combined so that multimedia content is outputted.

The multimedia content may include both 3D and 2D contents.

Figure 24:
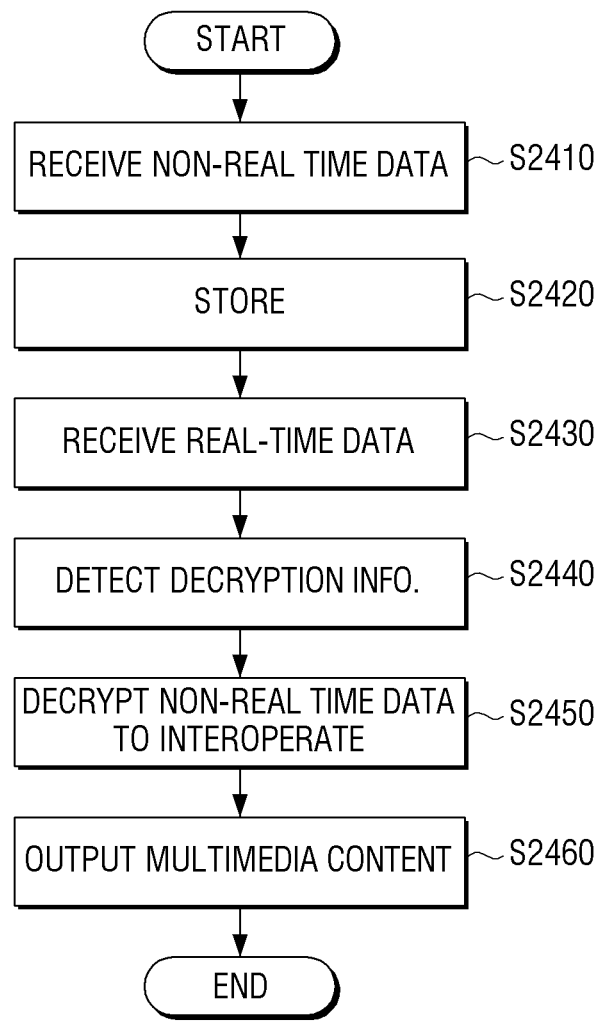
FIG. 24 is a flowchart provided to explain a method for processing content according to an embodiment, in which the playback of the nonreal-time data is controlled using the decryption information.

FIG. 24 is a flowchart provided to explain a method for processing content at a receiver according to a third embodiment. Referring to FIG. 24, at S2410, when the nonreal-time data is received, at S2420, the data is stored. The nonreal-time data is in encrypted state. After that, at S2430, when real-time data is received, at S2440, the decryption information is detected from the real-time data.

At S2450, the receiver detects nonreal-time data to be interoperated with the real-time data and decrypt the detected nonreal-time data using the decryption information.

After that, at S2460, the decrypted nonreal-time data and real-time data are combined so that multimedia content is outputted.

Since the method for processing content at a receiver according to the second and fourth embodiments are explained in detail above, illustration and description of the overall flow of these embodiments will be omitted for the sake of brevity.

As explained above, a receiver is capable of restricting arbitrary playback of nonreal-time data, in various manners. As a result, possibilities that broadcast information is inadvertently released before the planned broadcasting time, can be prevented.

Meanwhile, although the multimedia content may be played back with interoperation of the real-time data and nonreal-time data, it will be appreciated that the inventive concept is not limited to the above embodiments only.

For example, a method for protecting non content such as VOD may be implemented. That is, even the nonreal-time VOD content is necessarily restricted from being played back until the planned broadcast time.

To be specific, when a request to download content before the broadcast time is made using an IP network, the encrypted content may be provided, but with a release key, i.e., decryption information being provided at the intended broadcast time so that playback of the content before the broadcast time can be prevented.

Alternatively, downloaded content by an ATSC non real time (NRT) service may also be restricted from being played back, by a way of including a playback restriction indicator or playback restriction condition in the content being transmitted, or the playback may be restricted via encryption.

Programs to implement methods according to various embodiments including those explained above may be recorded and used on various types of recording media.

To be specific, codes to implement the methods may be stored on various types of terminal readable recording media such as, for example, random access memory (RAM), flash memory, read only memory (ROM), erasable programmable ROM (EPROM), electronically erasable and programmable ROM (EEPROM), register, hard disk, removable disk, memory card, USB memory, or CD-ROM.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A terminal device, comprising:
   a first receiver configured to receive nonreal-time data which comprise a first multi-media data which is encrypted, the first multi-media data constituting a content;
   a storage which stores the nonreal-time data;
   a second receiver configured to receive real-time data which comprise a second multi-media data constituting the content,
   wherein the nonreal-time data further comprises first interoperation information for playback in interoperation with the real-time data, the real-time data further comprises second interoperation information to playback in interoperation with the nonreal-time data, and the real-time data further comprises decryption information with respect to the first multi-media data or information about a source which provides the decryption information with respect to the first multi-media data, the decryption information comprising at least one of information about encryption algorithm applied to the first multimedia data and a key used for encryption, and
   the terminal device further comprising a processor configured to decrypt the first multi-media data being interoperative with the second multi-media data, using the decryption information when the real-time data is received, to combine the decrypted, first multi-media data with the second multi-media data, to output the content, and to restrict output of the nonreal-time data until a time of outputting the real-time data.

2. The terminal device of claim 1, wherein the nonreal-time data comprises first data which is non-encrypted, a playback restriction indicator to restrict playback of the real-time data until the time of outputting, and the first interoperation information to playback in interoperation with the real-time data,
   wherein the real-time data comprises second data and the second interoperation information to playback in interoperation with the nonreal-time data.

3. The terminal device of claim 2, wherein at least one from among the playback restriction indicator and the first interoperation information is recorded on one from among a program map table (PMT), an event information table (EIT), a reserved area, an extended field area, and a new field area within the nonreal-time data, or wherein at least one from among the playback restriction indicator and the first interoperation information is provided via a private stream having an independent packet identifier (PID).

4. The terminal device of claim 1, wherein the second receiver receives preceding real-time data comprising a playback restriction indicator with respect to the nonreal-time data, in advance of receiving real-time data for interoperation with the nonreal-time data, and
   the processor restricts playback of the nonreal-time data according to the playback restriction indicator included in the preceding real-time data.

5. The terminal device of claim 1, wherein the processor restrictively outputs the nonreal-time data according to a playback restriction condition, when a request for output of the nonreal-time data is inputted before the time of outputting the real-time data.

6. The terminal device of claim 1, wherein the processor detects any of the nonreal-time data that is interoperative with the real-time data when the real-time data is received.

7. The terminal device of claim 1, wherein the content comprises multimedia content.

8. A method for processing content, the method comprising:
   receiving nonreal-time data which comprise a first multi-media data which is encrypted, the first multi-media data constituting a content;
   storing the nonreal-time data at a storage;
   receiving real-time data which comprise a second multi-media data constituting the content,
   wherein the nonreal-time data further comprises first interoperation information for playback in interoperation with the real-time data, the real-time data further comprises second interoperation information to playback in interoperation with the nonreal-time data, and the real-time data further comprises decryption information with respect to the first multi-media data or information about a source which provides the decryption information with respect to the first multi-media data, the decryption information comprising at least one of information about encryption algorithm applied to the first multimedia data and a key used for encryption, and
   the method further comprising decrypting the first multi-media data being interoperative with the second multi-media data, using the decryption information when the real-time data is received, combining the decrypted, first multi-media data with the second multi-media data, outputting the content, and restricting output of the nonreal-time data until a time of outputting the real-time data.

9. The method of claim 8, wherein the nonreal-time data comprises first data which is non-encrypted, a playback restriction indicator to restrict playback of the real-time data until the time of outputting, and the first interoperation information to playback in interoperation with the real-time data, and
   wherein the real-time data comprises second data and the second interoperation information to playback in interoperation with the nonreal-time data.

10. The method of claim 8, further comprising receiving preceding real-time data comprising a playback restriction indicator with respect to the nonreal-time data, in advance of receiving the real-time data for interoperation with the nonreal-time data, wherein
    playback of the nonreal-time data is restricted according to the playback restriction indicator included in the preceding real-time data.

11. The method of claim 8, further comprising generating a reduced image of the nonreal-time data and outputting the reduced image, when a request for output of the nonreal-time data is inputted before the time of outputting the real-time data.

12. The method of claim 8, wherein the content comprises multimedia content.

13. The method of claim 8, wherein the detecting the any of the nonreal-time data that is interoperative with the real-time data is performed when the real-time data is received.

* * * * *